(12) United States Patent
Mattiocco et al.

(10) Patent No.: US 8,918,783 B2
(45) Date of Patent: Dec. 23, 2014

(54) MANAGING VIRTUAL COMPUTERS SIMULTANEOUSLY WITH STATIC AND DYNAMIC DEPENDENCIES

(75) Inventors: Attilio Mattiocco, Cassino (IT); Vincenzo Sciacca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1647 days.

(21) Appl. No.: 12/167,010

(22) Filed: Jul. 2, 2008

(65) Prior Publication Data

US 2009/0013321 A1    Jan. 8, 2009

(30) Foreign Application Priority Data

Jul. 4, 2007    (FR) .................................. 07111753.5

(51) Int. Cl.
*G06F 9/455*    (2006.01)

(52) U.S. Cl.
CPC ..................................... *G06F 9/455* (2013.01)
USPC ............................................................ 718/1

(58) Field of Classification Search
None
See application file for complete search history.

(56) References Cited

U.S. PATENT DOCUMENTS

| | | | |
|---|---|---|---|
| 7,313,512 B1 | 12/2007 | Traut et al. | |
| 7,467,378 B1 * | 12/2008 | Sobel | 717/168 |
| 2007/0074199 A1 * | 3/2007 | Schoenberg | 717/168 |
| 2007/0250833 A1 * | 10/2007 | Araujo et al. | 718/1 |
| 2008/0004094 A1 | 1/2008 | Mueller et al. | |
| 2008/0134176 A1 | 6/2008 | Fitzgerald et al. | |
| 2009/0217296 A1 | 8/2009 | Gebhart et al. | |
| 2009/0222560 A1 | 9/2009 | Gopisetty et al. | |
| 2009/0228984 A1 | 9/2009 | Sterin | |
| 2009/0249329 A1 | 10/2009 | Dash | |
| 2009/0300641 A1 | 12/2009 | Friedman et al. | |
| 2009/0328225 A1 | 12/2009 | Chambers et al. | |
| 2010/0306767 A1 | 12/2010 | Dehaan | |
| 2013/0007279 A1 | 1/2013 | Banjerjee et al. | |

OTHER PUBLICATIONS

"Using Snapshots"; Workstation 5 User's Manual; Nov. 15, 2006; p. 275-291; published by VMware, Inc., 3145 Porter Drive, Palo Alto, CA 94304 (available at: www.vmware.com/pdf/ws55_manual.pdf).

"The Snapshot Manager"; Workstation 5 User's Manual; Nov. 15, 2006; p. 282-286; published by VMware, Inc., 3145 Porter Drive, Palo Alto, CA 94304 (available at: www.vmware.com/pdf/ws55_manual.pdf).

"Cloning a Virtual Machine"; Workstation 5 User's Manual; Nov. 15, 2006; p. 292-300; published by VMware, Inc., 3145 Porter Drive, Palo Alto, CA 94304 (available at: www.vmware.com/pdf/ws55_manual.pdf).

"Movie Record and Playback"; Workstation 5 User's Manual; Nov. 15, 2006; p. 26-27; published by VMware, Inc., 3145 Porter Drive, Palo Alto, CA 94304 (available at: www.vmware.com/pdf/ws55_manual.pdf).

* cited by examiner

*Primary Examiner* — William B Partridge
(74) *Attorney, Agent, or Firm* — Brevetto Law Group

(57) ABSTRACT

Embodiments are disclosed for managing a plurality of virtual computers in a virtual environment. According to one embodiment, a method includes creating a virtual group. The virtual group includes a plurality of virtual computers having a relevant characteristic. An action to perform on the virtual group is received, and the action is performed on each of the virtual computers in the virtual group.

25 Claims, 9 Drawing Sheets

MANAGING VIRTUAL COMPUTERS SIMULTANEOUSLY WITH STATIC AND DYNAMIC DEPENDENCIES

CROSS-REFERENCE TO RELATED APPLICATIONS

This application claims the benefit of foreign priority to European Patent Application No. 07111753.5, filed Jul. 4, 2007.

BACKGROUND

Embodiments of the disclosure relate to managing virtual computers in a virtual environment. A virtual environment typically includes a large number of virtual machines residing on a small number of real servers. In this specification, references to computer and machine may be used to reference the same technology. In maintaining or operating a machine, it is often necessary to perform a number of operations (e.g. installing a software bundle, or changing configuration parameters) thereon. In a virtual environment these operations must be repeated for a number (if not all) of the virtual machines in that environment.

SUMMARY

According to an embodiment a method for managing a plurality of virtual computers is provided. The method includes creating a virtual group. The virtual group includes a plurality of virtual computers having a relevant characteristic. An action to perform on the virtual group is received, and the action is performed on each of the virtual computers in the virtual group.

DRAWING DESCRIPTION

DETAILED DESCRIPTION

1. Grouping of Virtual Machines An embodiment may provide a flexible and dynamic mechanism for grouping virtual machines, wherein the virtual machines may be grouped according to one or more common shared characteristics that may be specified by the user. Thus, a group may comprise one or more virtual machines which are related to each other in a non-hierarchical manner, through one or more shared attributes known as group characteristics. The attributes considered within the group characteristics, may include inter alia:

file attributes (e.g. detailing particular versions of files etc);
registry attributes (single key or entire registry trees);
installed programs (detailing for example, the version or language of the programs);
screen Resolution attributes; and
accounts information. For example, a virtual machine operating on a particular network (e.g., a local area network (LAN) which we will call LAN.sub.2), may employ the Windows (trade mark) operating system in support of a database (DB) program (e.g., DB version 2). The virtual machine may be a member of three groups, such as, for example, a Windows (trade mark) group, a DB version 2 group and a LAN.sub.2 group.

2. Creating Groups

Figure 1:
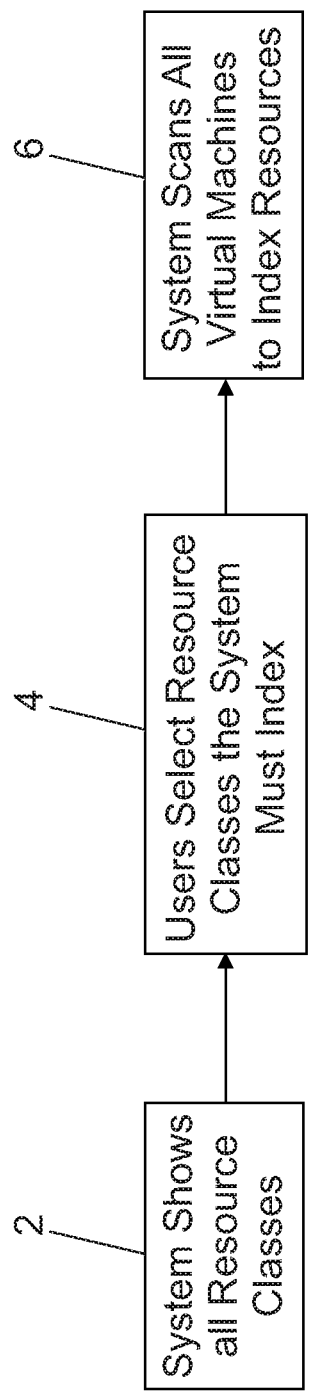
FIG. 1 is a flowchart of a resource indexing operation according to an embodiment.

A group may be created manually or automatically (as a result of an action being created and executed). However, before groups are created, the embodiment may index the resources of the virtual machines in the virtual environment. Thus, the steps of indexing the resources may be a precursor to both the manual and automatic methods of group creation. Referring to FIG. 1, the resource indexing operation may comprise the steps of:

showing 2 a user all the potential resource classes;
allowing the user to select 4 the resource classes the embodiment must index; and
scanning 6 all the virtual machines in the virtual environment to determine and index their resources.

2(a) Manual Group Creation

Figure 2:
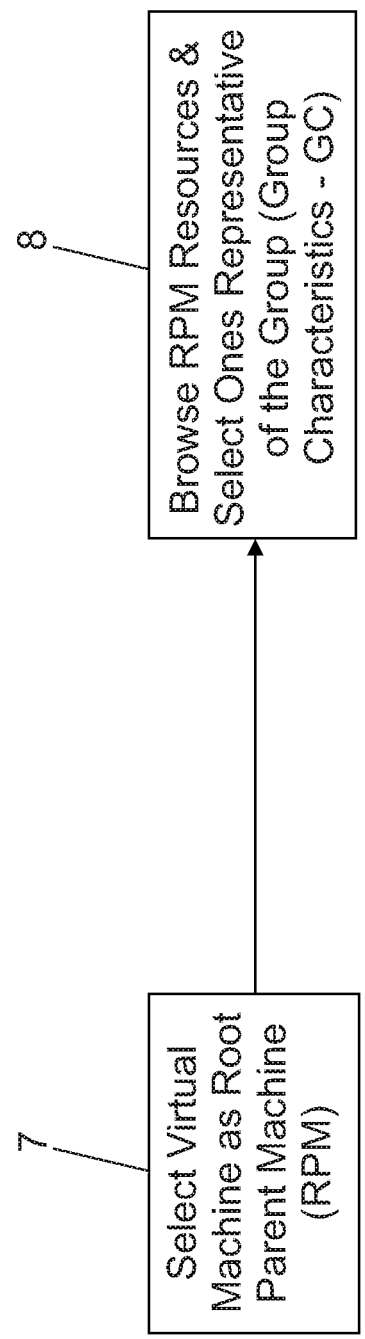
FIG. 2 is a block diagram of a manual method of creating virtual groups according to an embodiment.

Referring to FIG. 2, in the manual group creation process, a virtual machine may first be selected 7 as a root parent machine (RPM), and a number of the attributes of the root parent machine may be reviewed 8 to allow the user to identify the attributes that may be characteristic of the group (e.g. virtual machines employing the Windows (trade mark) operating system). The virtual machines possessing these attributes may then form the relevant group.

2(b) Creating an Action

The manual group creation process may be followed by creating an action to be performed by the relevant group. The automatic group creation process may be preceded by the creation of an action.

Figure 3:
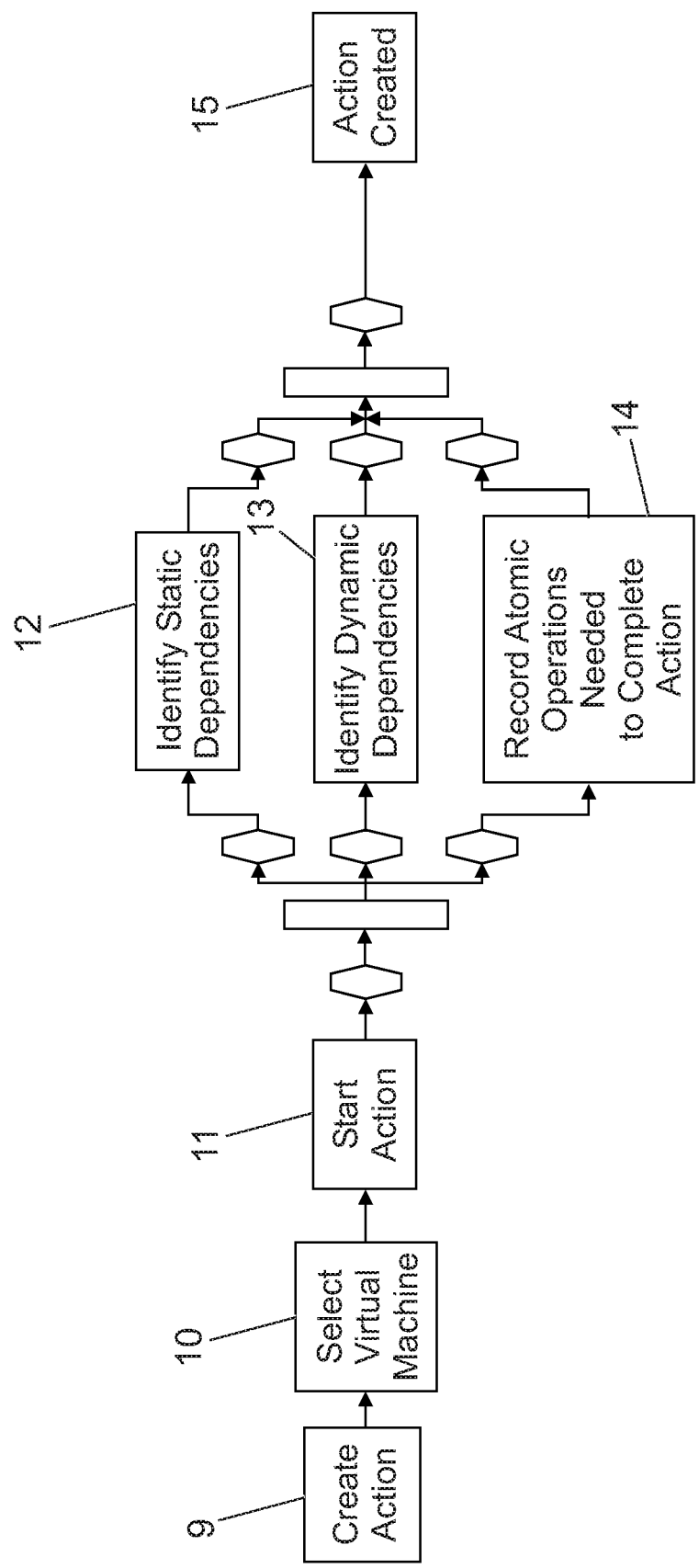
FIG. 3 is a flowchart of an action creation according to an embodiment.

Referring to FIG. 3, the process of creating an action may comprise allowing a user to define 9 the action of interest; allowing the user to select 10 a virtual machine on which the action is to be performed; identifying 12, 13 the static and dynamic dependencies (to be discussed later) of the action; and recording 14 the atomic operations needed to complete the action.

2(c) Automatic Group Creation

In an embodiment, the automatic group generation scheme may permit an administrator of a virtual environment to construct an index from a subset of all the available classes of resources. In particular, the administrator may be allowed to select which of the available classes of resources is to be used to construct the index. Thereafter, the automatic group creation scheme may index the selected subset of the resources of all (or a defined set) of the virtual machines in the virtual environment. In an embodiment, all the resources of all the virtual machines in a virtual environment may be indexed.

Figure 4:
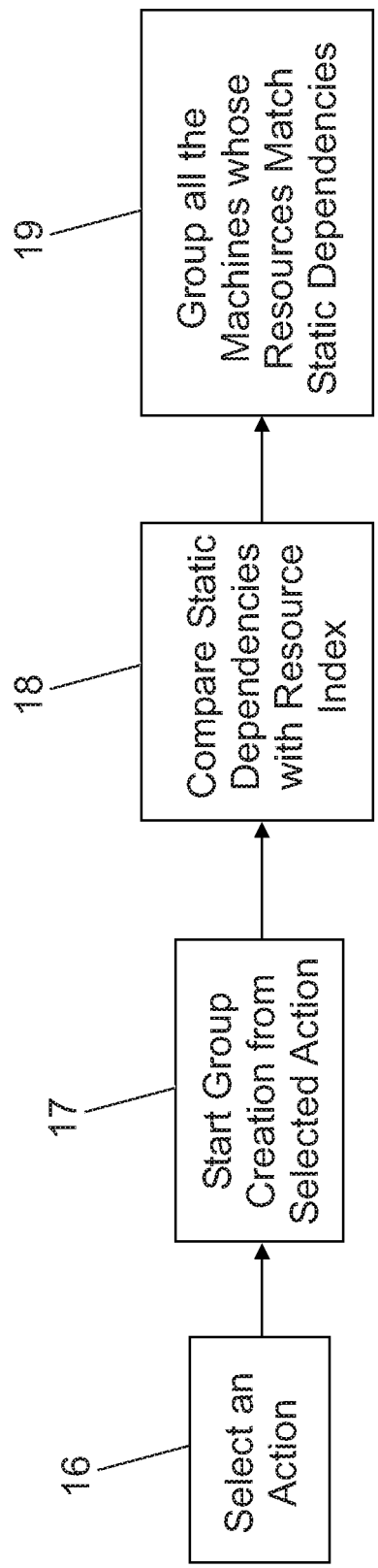
FIG. 4 is a flowchart of an automatic method of creating virtual groups according to an embodiment.

Referring to FIG. 4, the administrator may then be permitted to open a virtual machine and create 16 a new action (e.g. install a patch on a particular piece of software) therefore (as shown in FIG. 3). The embodiment may then perform the required action, and in doing so, perform a series of steps that may employ a number of the resources of the virtual environment.

The embodiment may construct a list of resources involved in performing the action, and those created in performing the action. For clarity, these resources are known henceforth as static and dynamic dependencies respectively, and will be described in more detail later. The embodiment may compare 18 the static dependencies with the resources previously indexed, to determine which of the virtual machines have resources that match static dependencies. The embodiment may then form 19 a group from the matching machines.

It should be noted that in an embodiment only those resource classes previously selected to be indexed by the administrator may be used to construct the list of static and dynamic dependencies. For example, if the administrator only selected registry keys as the resource to be indexed during the preliminary stages of the automatic group creation scheme, only the registry keys may be recorded in the list of static and dynamic dependencies. However, in order to replay the action, the embodiment may record all the resources involved in the action (and not just the registry keys). Having constructed the list of static and dynamic dependencies for the action, the embodiment may use the outcome and its associated list as a template for the creation of a new group.

3. Performing an Action

In performing a desired action on the virtual machines of the virtual environment, the embodiment may implement two separate, albeit interlinked processes in parallel. The first process may comprise performing the action itself and the second process may involve maintaining the consistency of the relationships between the above-mentioned different groups, whilst the action is being performed.

Figure 5:
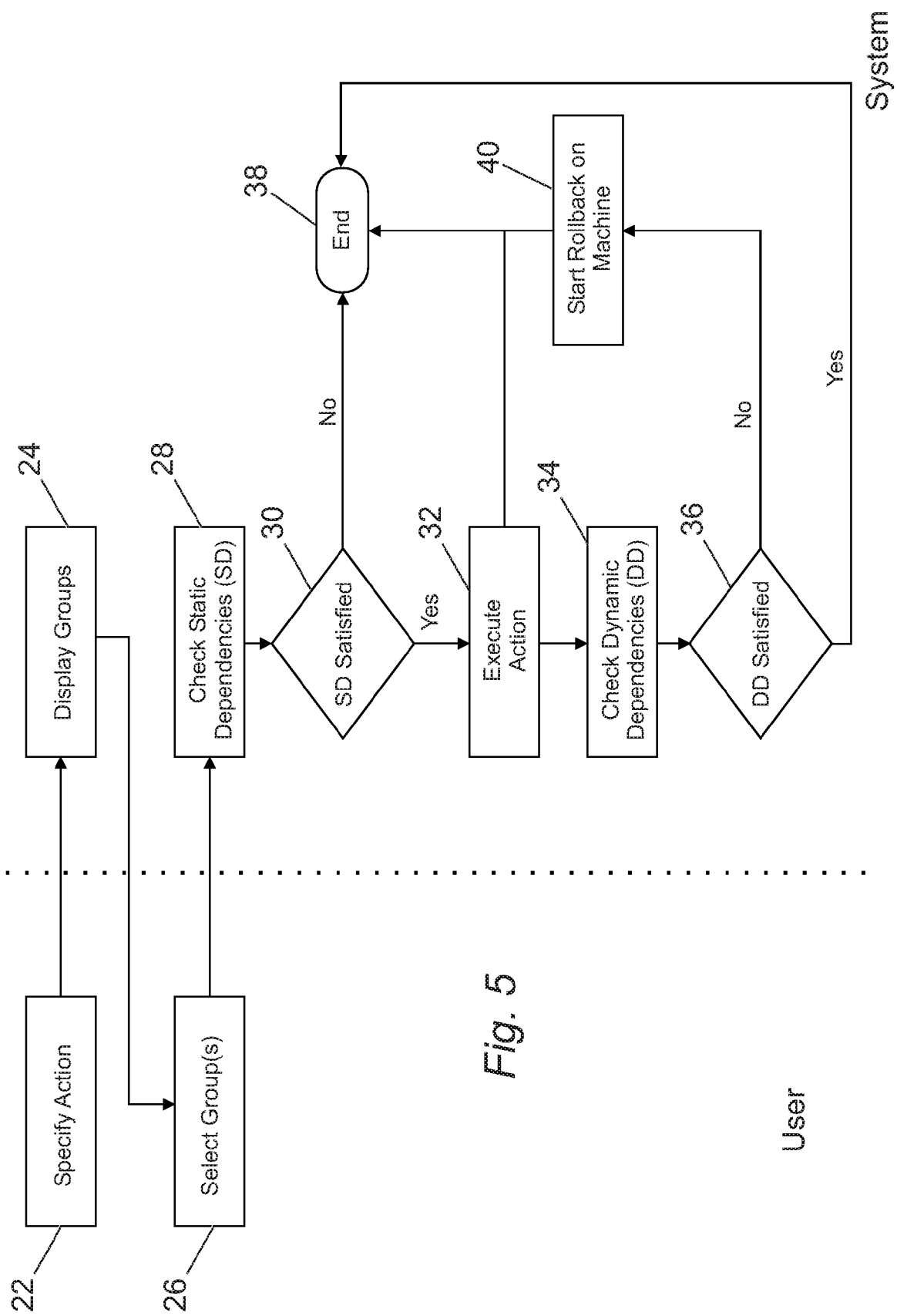
FIG. 5 is a block diagram of a method of managing the activities of virtual machines in a virtual environment according to an embodiment.

Referring to FIG. 5, in a first step of performing an action, the user may be provided with a facility for defining 22 the desired operation or action (using the procedure shown in FIG. 1) to be applied simultaneously to a one or more virtual machines in a virtual environment. The actions may include configuration changes that are possible through an external file (e.g. a VMWare (trade mark) Option), without the need for interaction with the operating system of the each virtual machine. Alternatively, the actions may include configuration changes that have to be implemented by interacting with the operating system (e.g. by remote control like input grab) of the each relevant virtual machine.

When the user indicates that he wants to apply a particular action to a virtual environment, the embodiment may present 24 the user with a list of the current groups in the environment and the members of the groups. In other words, the embodiment may provide the user with a grouping picture of the virtual environment, for example, listing the virtual machines which are running DB version 2 and which have a particular patch installed thereto.

The user may determine from the list the relevant group for his desired action. Furthermore, the user may decide whether or not the action is to be applied to all of the machines in a given group. In other words, the embodiment may enable the user to select 26 a one or more of the displayed groups (or a subset of any of the groups) to which to apply a given action.

Using the above example, a user may wish to install a patch on virtual machines running the DB version 2 software package. In this case, the user may be provided with an option for specifying the wish to install a patch. The user may be further provided with the option of specifying some or all of the virtual machines in the DB version 2 group.

On receiving the group (or subset thereof) specified by the user and action/operation to be applied to the virtual machines therein, an embodiment may check whether the desired action (e.g. installation of a patch) can be applied to all of the virtual machines within the selected group (or subset thereof). In other words, the embodiment may check 28 for the presence in the selected group (of virtual machines) of the first (initial) resources that may be required to perform the desired action. As will be recalled, these initial requirements are known as static dependencies. In an embodiment, the static dependencies may have to be satisfied in order for the desired action to start. Using the above example of installing a new patch for a DB version 2 software program, the checking 28 the static dependencies could include checking that all the DB version 2 registry keys are present in a virtual machine. If 30 the static dependencies are satisfied, the embodiment may multicast the relevant information (or commands) to the relevant virtual machines, to cause the desired action to be executed 32 therein.

As an aside, whilst the above description has focussed on managing changes or substantially simultaneously applying operations/actions to a plurality of virtual machines, it will be understood that an embodiment may also provide a facility for inserting machine specific data, or changing the configurations of individual virtual machines etc.

Furthermore, an embodiment may check that variables or resources required to perform the desired action are updated (in all the machines belonging to the selected group(s) or sub-group(s)) in accordance with the performance of the action. As will be recalled, these requirements are known as dynamic dependencies. Thus, an embodiment may effectively check 34 that the dynamic dependencies have been satisfied in all the machines belonging to the selected group(s) (or subgroup(s)). Using the above example of installing a patch on a DB version 2 software program, this may involve checking whether a change in the registry key caused by the installation process has been recorded in the virtual machines in the selected group(s) (or sub-group(s)).

In particular, if 36 a one or more dynamic dependencies are satisfied by a virtual machine in the selected group(s) (or sub-group(s)) the action may be completed and the process may terminate 38. However, if 36 during the execution of the desired action something happens to variables/resources associated therewith (wherein this happening does not comply with what might be expected for this action), so that the one or more dynamic dependencies are not satisfied by a particular virtual machine in the selected group(s) (or sub-group(s)), the embodiment may reverse 40 all the steps executed in performing the desired action on the virtual machine in question. As a result, the virtual machine in question may be restored to its previous state, prior to the performance of the desired action. This process is known as a "roll-back" process and may be performed using snapshots taken of the status of the virtual machines before applying the action thereto. Similarly, the roll-back operation may comprise restoring the relationships (that existed before the performance of the desired action) between the virtual machine in question and the rest of the virtual machines. The process may then terminate 38.

4. Group Consistency Checking

The group consistency checking process may operate in parallel with the performance of the desired action to update the grouping information on the virtual environment and thereby manage the consistency of the relationships between the groups of the virtual machines (i.e. to ensure that whilst the desired action is being performed, the shared characteristics between the grouped virtual machines do not change).

Figure 6:
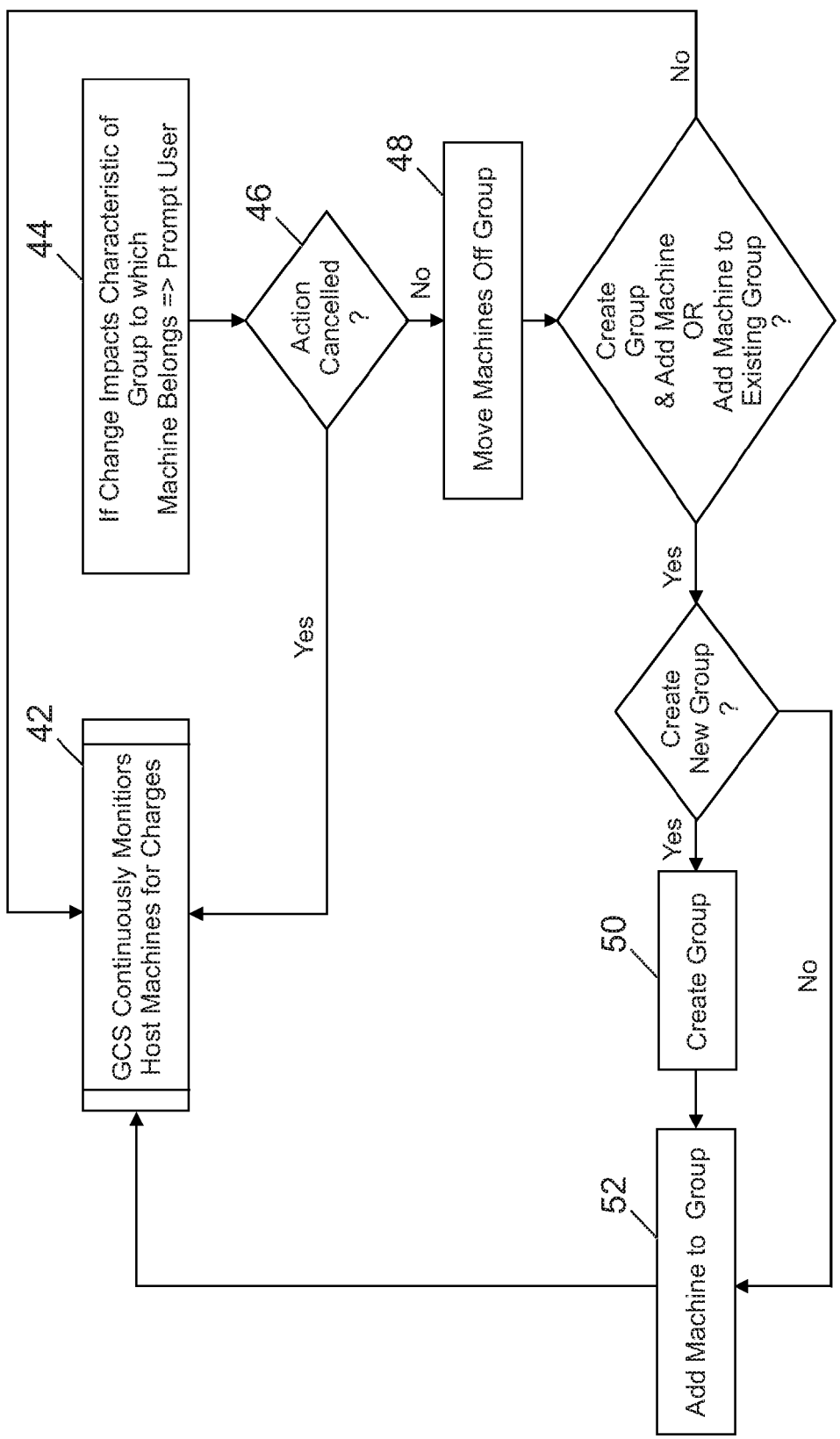
FIG. 6 is a block diagram of a method of managing the consistency of a virtual machine grouping according to an embodiment.

Referring to FIG. 6, during the group consistency checking process a group consistency manager (to be discussed below)

may continuously monitor 42 the virtual machines in the virtual environment. The group consistency manager may provide 44 a prompt to the user in the event that the execution of a desired action/operation in a virtual machine causes a change in the relevant group characteristic of the virtual machine.

If the user cancels 46 the operation, the group consistency manager may return to continuously monitoring 42 the virtual machines. However, if the user does not cancel the operation, the virtual machine in question may be removed 48 from the relevant group.

Thus, in the event that the performance of a desired action causes the consistency within a group to be damaged, there may be two different remedies, namely: (a) cancel 46 or roll-back the action as shown in FIG. 3; or (b) remove 48 the offending machine from the relevant group.

If the user chooses to remove 48 the offending machine from the relevant group, the group consistency checking process may provide the user with the option of creating a new sub-group (of the original group) and adding the offending machine thereto; or adding the offending machine to another existing group. Take for example the process of upgrading the version of software on a group of virtual machines. More particularly, take the example of upgrading the version of a database program from the DB version 2.0 to DB version 2.1. In this case, an original group could comprise all the virtual machines running the DB version 2.0 database program and a sub-group thereof could comprise all the virtual machines whose database program has been updated to DB 2.1. Thus, these virtual machines may be in a more up-to-date state than the rest of the virtual machines in the virtual environment.

Should the user choose to create a new sub-group for the offending machine or to add the machine to a pre-existing group, the group consistency checking process may create 50 the relevant sub-group, add 52 the machine thereto (or add 52 the machine to a pre-existing group), and return to monitoring 42 the virtual environment.

The embodiment may also enable a user to decide that the change in question is not sufficient to warrant the creation of a new sub-group. This facility may provide a balance between improving the granularity of the grouping whilst avoiding uncontrolled growth in the number of groups in the virtual environment.

Thus, the embodiment may effectively keep track of (and manage) the status of the virtual environment. As a result, the embodiment may show a user all the resources available for a required action, (e.g. which files are created destroyed and registry keys changed). Thus, the embodiment may provide an enhancement on a standard multicast strategy, insofar as it may enable the grouping of multicast targets and the maintenance of dynamic consistency relationships between the groups.

5. Architecture

The architecture of an embodiment may comprise three subsystems namely a group consistency manager, an action manager and a relationship manager. The group consistency manager may be responsible for creating, defining and keeping track of groups and their characteristics. The action manager may enable an action (software installation, configuration change, etc.) to be applied to a number of virtual machines in a scalable, parallel way, avoiding the necessity of repeating the single action for every and each virtual machine in the virtual environment.

When the user tries to perform an action on some or all of the virtual machines in a selected group, the relationship manager may determine whether the desired action can be implemented on all of the selected virtual machines. For example, let the user wish to install a patch on all of the virtual machines in $LAN_2$ running version 2 of the DB program. In other words, the desired action received from the user by the action manager is that of installing a patch on all of the virtual machines in $LAN_2$ running version 2 of the DB program). Let the user select (from the group consistency manager) the group comprising all the virtual machines in the $LAN_2$ group. However, let some of the virtual machines actually present on the relevant LAN (i.e. $LAN_2$) run DB version 1 (i.e. an earlier version of the DB program). In this case, it may not be possible to install the patch (intended for DB program version 2) to the virtual machines running the DB version 1 program. If the desired action is inconsistent with any of the characteristics of the selected virtual machines, the relationship manager may be responsible for managing any eventual group branching and new group creations. Using the above example, the desired action (i.e. the installation of the patch) may be applied to those virtual machines in the $LAN_2$ group that satisfy the software pre-requisite of running the DB version 2 program, and a subgroup may be created from the $LAN_2$ group comprising these virtual machines.

To facilitate these operations, static and dynamic dependencies may be associated with individual actions. A static dependency relates to the characteristics of the group target for an action. These static dependencies may be satisfied before launching the action. Dynamic dependencies may be satisfied during the progress of an action. The action manager may be responsible to execute the action.

Figure 7:
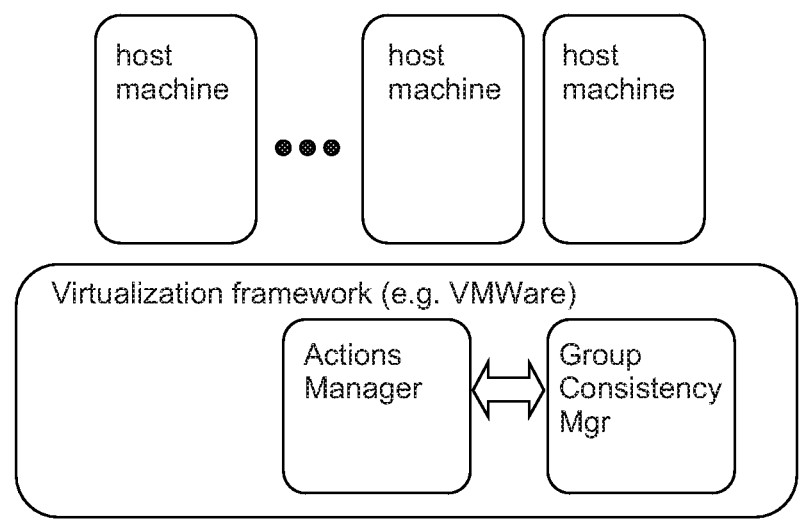
FIG. 7 is a block diagram of a system embedded in a virtualization framework according to an embodiment.
Figure 8:
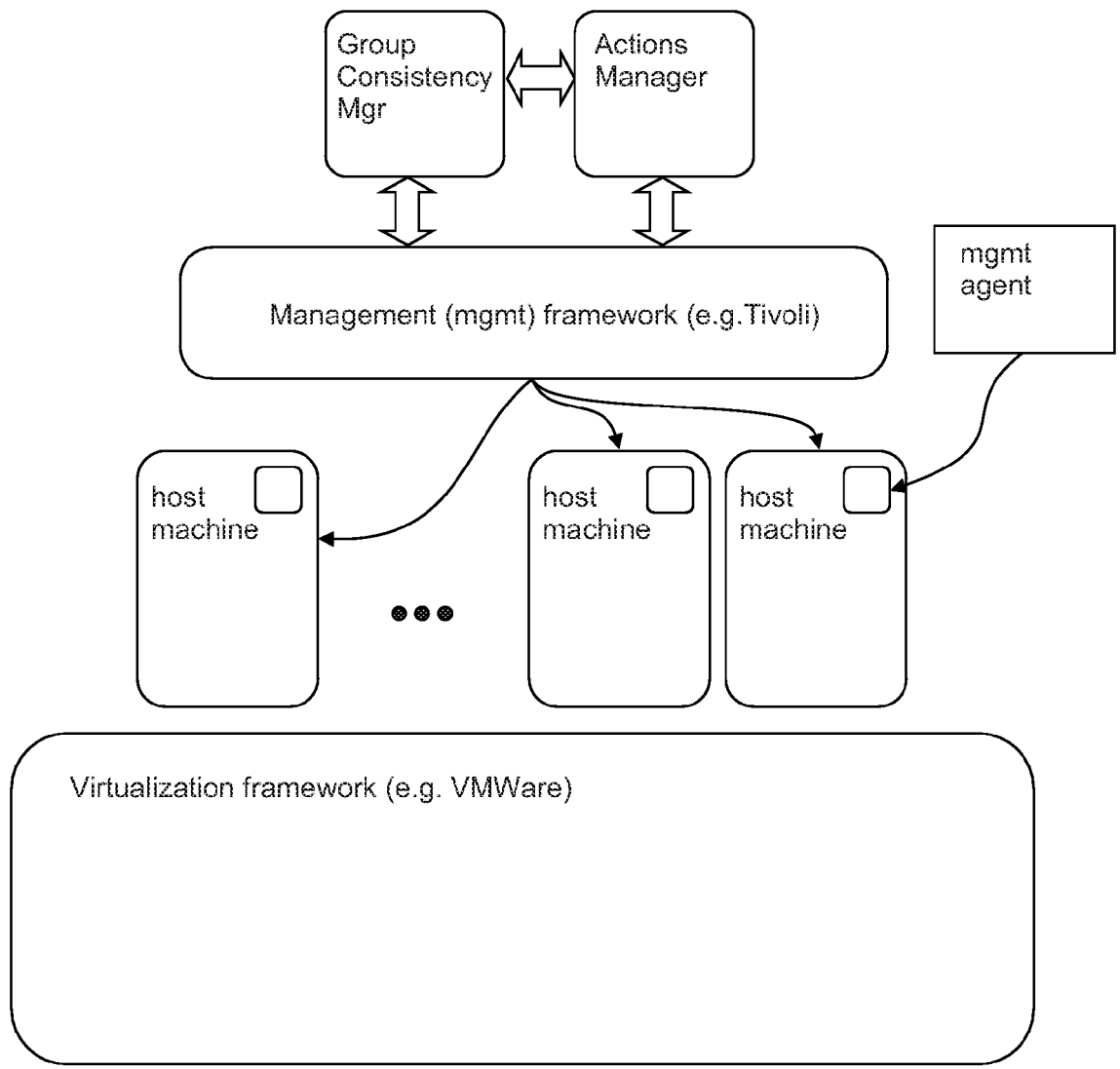
FIG. 8 is a block diagram of a system implemented as an external tool to a virtualization environment according to an embodiment.

It will be appreciated that the embodiment could be implemented inside a virtualization framework (e.g. new VMWare tool as shown in FIG. 7). Alternatively, the embodiment could be implemented as an external tool, based on an ad hoc created software and existing management software (as the Tivoli Software Distribution), as shown in FIG. 8.

Figure 9:
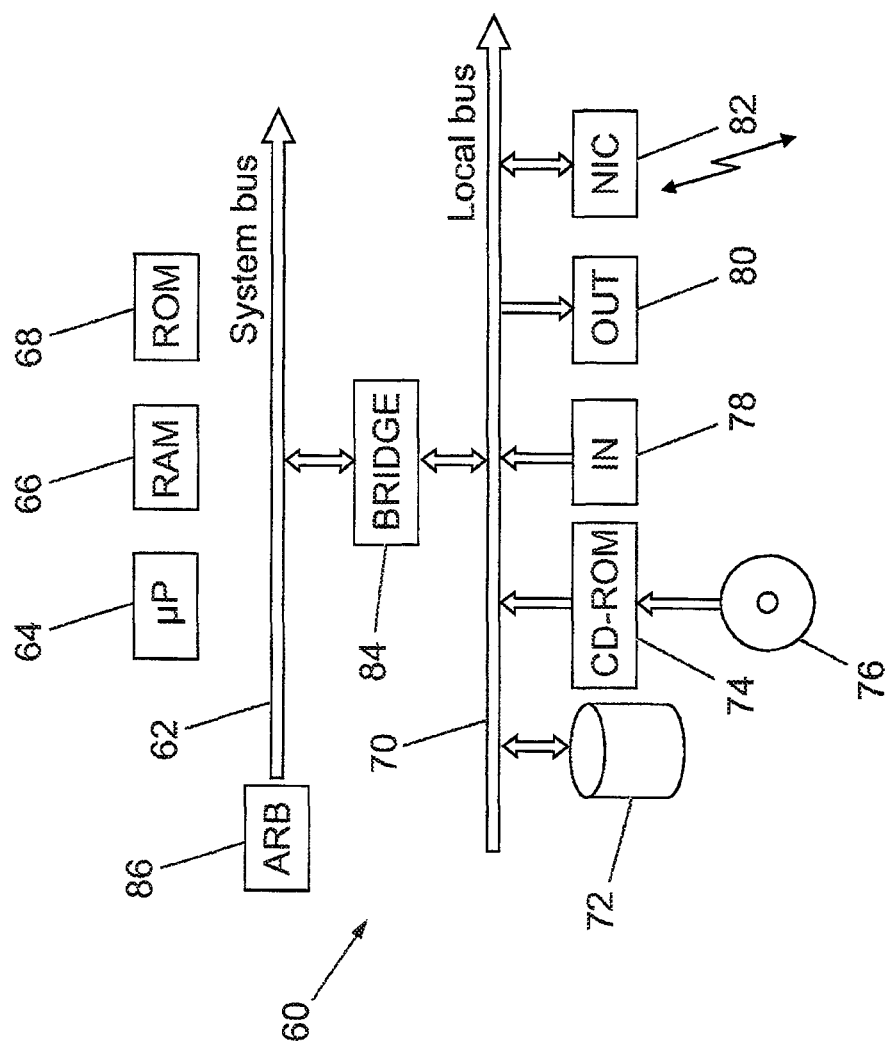
FIG. 9 is a block diagram of a virtual machine on which an embodiment operates.

The individual virtual machines on which the embodiment operates may have a generic structure as shown in FIG. 9. More particularly, a generic computer of the system is denoted with 60. The computer 60 may be formed by several units that are connected in parallel to a system bus 62. In detail, one or more microprocessors 64 may control operation of the computer 60, a random access memory (RAM) 66 may be directly used as a working memory by the microprocessors 64, and a read only memory (ROM) 68 may store basic code for a bootstrap of the computer 60. Peripheral units may be clustered around a local bus 70 (by means of respective interfaces). Particularly, a mass memory may include a hard-disk 72 and a drive 74 for reading compact disk-read only memories (CD-ROMs) 76. Moreover, the computer 60 may include input devices 78 (for example, a keyboard and a mouse), and output devices 80 (for example, a monitor and a printer). A Network Interface Card (NIC) 82 may be used to couple the computer 60 to the network. A bridge unit 84 may interface the system bus 62 with the local bus 70. Each microprocessor 64 and the bridge unit 84 may operate as master agents requesting an access to the system bus 62 for transmitting information. An arbiter 86 may manage the granting of the access with mutual exclusion to the system bus 62.

Similar considerations apply if the system has a different topology, or it is based on other networks. Alternatively, the computers may have a different structure, include equivalent units, or consist of other data processing entities (such as personal digital assistant (PDAs), mobile phones, and the like).

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable storage medium providing program code for use by or in connection with a computer or any instruction execution system. For the purposes of this description, a computer-usable or computer readable storage medium can be any apparatus that can contain, store, communicate, propagate, or transport the program for use by or in connection with the instruction execution system, apparatus, or device.

The storage medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. A method comprising:
   creating a virtual group, wherein the virtual group includes a plurality of virtual computers having a relevant characteristic;
   receiving an action to be performed simultaneously on the plurality of virtual computers in the virtual group;
   checking static dependencies required for said action, wherein the static dependencies comprise resources and registry keys required for performing the action;
   initiating performance of the action on each of the virtual computers in the virtual group in response to verifying that said static dependencies are satisfied;
   checking a plurality of dynamic dependencies, wherein the plurality of dynamic dependencies comprises changes in resources and registry keys to verify performance of the action; and
   performing a roll-back process on at least one of the plurality of virtual computers in response to determining that at least one dynamic dependency is not satisfied, the roll-back process including restoring the at least one of the plurality of virtual computers to a previous state from prior to the performing the action.

2. The method of claim 1, wherein said virtual group comprises three or more computers, the method further comprising:
   updating resource information for each of the virtual computers in the virtual group to indicate that the action has been performed in response to verifying that said at least one dynamic dependency is satisfied.

3. The method of claim 2, further comprising:
   checking the resource information for each of the virtual computers in the virtual group to determine whether the action changed the relevant characteristic.

4. The method of claim 3, further comprising:
   removing one of the virtual computers from the virtual group in response to determining that the action changed the relevant characteristic of the one of the virtual computers.

5. The method of claim 1, wherein the creating the virtual group includes manually creating the virtual group by selecting a root parent machine, wherein the root parent machine includes a plurality of attributes.

6. The method of claim 5, wherein the creating the virtual group further includes allowing a user to select one of the attributes to be the relevant characteristic.

7. The method of claim 1, further comprising:
   determining resource information for each of the virtual computers; and
   indexing the resource information for each of the virtual computers.

8. The method of claim 1, wherein the creating the virtual group includes automatically creating the virtual group by constructing a list of static dependencies and dynamic dependencies, wherein the static dependencies are resources involved in the performing the action, and wherein the dynamic dependencies are resources created by the performing the action.

9. The method of claim 8, wherein the creating the virtual group further includes determining which of the virtual computers includes the static dependencies, and creating the virtual group based on at least one of the static dependencies.

10. The method of claim 1, further comprising:
    determining whether the action can be performed on each of the virtual computers in the virtual group prior to performing the action.

11. The method of claim 1, wherein the performing the action includes updating software.

12. The method of claim 1, wherein the virtual group is a first virtual group; and
    wherein at least one of the plurality of virtual computers is a member of the first virtual group and also a second virtual group.

13. The method of claim 1, wherein the performing of the action comprises performing the action in parallel on each of the virtual computers in the virtual group.

14. A system comprising:
    a micro-processor; and
    a memory element, wherein the memory element includes computer-readable instructions that are executable by the processor to:

create a virtual group, wherein the virtual group includes a plurality of virtual computers having a relevant characteristic;

receive an action to be performed simultaneously on the plurality of virtual computers in the virtual group;

check static dependencies required for said action, wherein the static dependencies comprise resources and registry keys required for performing the action;

initiate performance of the action on each of the virtual computers in the virtual group in response to verifying that said static dependencies are satisfied;

check a plurality of dynamic dependencies, wherein the plurality of dynamic dependencies comprises changes in resources and registry keys to verify performance of the action; and perform a roll-back process on at least one of the plurality of virtual computers in response to determining that at least one dynamic dependency is not satisfied, the roll-back process including restoring the at least one of the plurality of virtual computers to a previous state from prior to the performing the action.

15. The system of claim 14, wherein said virtual group comprises three or more computers and wherein the memory element further includes computer-readable instructions that are executable by the processor to:

update resource information for each of the virtual computers in the virtual group to indicate that the action has been performed in response to verifying that said at least one dynamic dependency is satisfied.

16. The system of claim 15, wherein the memory element further includes computer-readable instructions that are executable by the processor to:

check the resource information for each of the virtual computers in the virtual group to determine whether the action changed the relevant characteristic.

17. The system of claim 14, wherein the memory element further includes computer-readable instructions that are executable by the processor to:

determine whether the action can be performed on each of the virtual computers in the virtual group prior to performing the action.

18. The system of claim 14, wherein the virtual group is a first virtual group; and wherein at least one of the plurality of virtual computers is a member of the first virtual group and also a second virtual group.

19. The system of claim 14, wherein the performing of the action comprises performing the action in parallel on each of the virtual computers in the virtual group.

20. A computer program product comprising:

a non-transitory computer-readable storage medium comprising computer-readable instructions to:

create a virtual group, wherein the virtual group includes a plurality of virtual computers having a relevant characteristic;

receive an action to be performed simultaneously on the plurality of virtual computers in the virtual group;

check static dependencies required for said action, wherein the static dependencies comprise resources and registry keys required for performing the action;

initiate performance of the action on each of the virtual computers in the virtual group in response to verifying that said static dependencies are satisfied;

check a plurality of dynamic dependencies, wherein the plurality of dynamic dependencies comprises changes in resources and registry keys to verify performance of the action; and perform a roll-back process on at least one of the plurality of virtual computers in response to determining that at least one dynamic dependency is not satisfied, the roll-back process including restoring the at least one of the plurality of virtual computers to a previous state from prior to the performing the action.

21. The computer program product of claim 20, wherein said virtual group comprises three or more computers and wherein the computer-readable storage medium further comprises computer-readable instructions to:

update resource information for each of the virtual computers in the virtual group to indicate that the action has been performed in response to verifying that said at least one dynamic dependency is satisfied.

22. The computer program product of claim 21, wherein the computer-readable storage medium further comprises computer-readable instructions to:

check the resource information for each of the virtual computers in the virtual group to determine whether the action changed the relevant characteristic.

23. The computer program product of claim 20, wherein the computer-readable storage medium further comprises computer-readable instructions to:

determine whether the action can be performed on each of the virtual computers in the virtual group prior to performing the action.

24. The computer program product of claim 20, wherein the virtual group is a first virtual group; and wherein at least one of the plurality of virtual computers is a member of the first virtual group and also a second virtual group.

25. The computer program product of claim 20, wherein the performing of the action comprises performing the action in parallel on each of the virtual computers in the virtual group.

* * * * *